Patented Aug. 23, 1949

2,479,657

UNITED STATES PATENT OFFICE 2,479,657

PREPARATION OF PIPERAZINE

Benjamin G. Wilkes, Jr., Wilkinsburg, Pa., assignor to Carbide and Carbon Chemicals Corporation, a corporation of New York No Drawing. Application June 22, 1946, Serial No. 678,686

4 Claims. (Cl. 260—268)

This invention relates to the production of piperazine by the catalytic intramolecular condensation of N-aminoethyl ethanolamine, 2-(2-aminoethylamino)ethanol, and more especially it concerns the production of piperazine in good yields with high efficiencies by condensing N-aminoethyl ethanolamine at elevated temperatures in the presence of a copper-containing condensation catalyst. The condensation preferably is conducted under a superatmospheric pressure of hydrogen amounting to at least 300 pounds per square inch.

A principal object of the invention is to provide an improved efficient process for producing piperazine from N-aminoethyl ethanolamine in the presence of certain catalysts which do not induce deamination side reactions under the conditions at which the condensation reaction is conducted, and under conditions inhibiting the formation of resinous by-products.

The reaction involved evidently is not a simple dehydration of the substituted ethanolamine. It is probable that the mechanism for the overall reaction involves a dehydrogenation of the alcohol group of the starting material to yield an aldehyde, an intramolecular condensation of the aldehyde and amino groups to form a cyclic Schiff's base, and the hydrogenation of this intermediate, as indicated in the following equations:

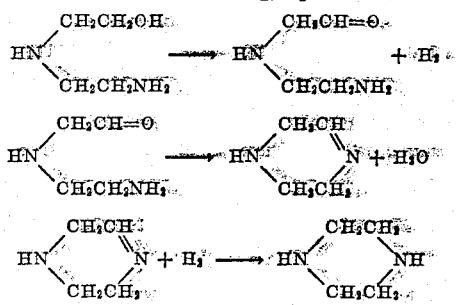

The evidence in support of this series of reactions is that dehydration catalysts which might produce a simple ring closure with the formation of piperazine by the elimination of the elements of water are not effective. Relatively low yields of piperazine are secured, even when using a hydrogenation-dehydrogenation catalyst, in the absence of added hydrogen at elevated pressures. However, the invention is not intended to be limited by any theory as to the reaction involved.

Broadly considered, the process involves heating N-aminoethyl ethanolamine in the presence of a copper-containing catalyst, such as copper, copper oxide, copper chromite, mixtures of copper and chromium, and mixtures of copper and chromium oxides. The catalyst also may contain one or more additional compounds functioning as condensation catalysts—e. g., nickel, cobalt, and their oxides—although this generally is at the sacrifice of efficiency of the process. The reaction is conducted in the liquid phase in a suitable pressure-tight reaction vessel provided with means for agitating the charge, e. g., a stainless steel rocker-type autoclave.

After continuing the reaction for several hours or more, until the reaction mixture contains a good yield of piperazine, it is filtered while hot to remove the catalyst. The filtrate then may be processed in suitable manner to recover therefrom the piperazine and any unreacted aminoethyl ethanolamine. Thus, the filtrate may be fractionally distilled, and these materials and the water of condensation separately isolated and recovered.

It is particularly important in the interests of the best yields of piperazine that an atmosphere of added hydrogen be present in the mixture of reactants when conducting the intramolecular condensation reaction under superatmospheric pressures. It generally is preferred to conduct the condensation under a superatmospheric pressure of 300 pounds or more per square inch, maintained by the imposition of hydrogen under pressure upon the liquid. The optimum relationship of yield of piperazine to condensation efficiency has been secured when using temperatures within the range from about 175° C. to about 220° C., under hydrogen pressures of from 1,000 to 2,500 pounds per square inch. At higher temperatures deamination reactions are induced, which tend to lower the yield of piperazine and to reduce markedly the efficiency of the process.

Failure to impose hydrogen under pressure upon the reaction mixture during the condensation reaction also decreases the efficiency of the reaction due to the formation of resinous residues. Such residues apparently result from resinification of dehydrogenated interim products rather than from deamination reactions.

Thus, piperazine has been obtained in yields around 64% and at efficiencies of about 90% by heating N-aminoethyl ethanolamine at 200° C. for eighteen hours, under a hydrogen pressure of 1,500 pounds per square inch, in the presence of 10% of its weight of a copper-chromium oxide catalyst. In similar reactions at atmospheric pressure in the absence of added hydrogen, the aminoethyl ethanolamine evolved hydrogen freely, and the yield of piperazine was much lower, More important, however, the uncontrolled dehydrogenation in the absence of added hydrogen led to the formation of considerable amounts of resinous residues that interfered with the recovery of unreacted aminoethyl ethanolamine, and seriously lowered the process efficiency.

Among copper-containing catalysts highly useful in the process may be mentioned copper oxide, prepared by the ignition of copper nitrate in the presence of air. By use of this catalyst N-aminoethyl ethanolamine has been converted into piperazine in highly satisfactory yield and with an efficiency of at least 92%. Other highly effective copper-containing catalysts include copper chromite, and catalysts containing copper and chromium oxides such as that wherein, for instance, the copper and chromium are present in the proportion of 100.0 to 13.8. Catalysts containing other proportions of copper and chromium may be used. Such catalysts may be prepared by co-precipitation of the carbonates of the metals by addition of ammonium carbonate solution to a solution of the nitrates, after which the precipitate is washed, dried and roasted.

In each case where copper oxide is the catalyst or is present in the catalyst at the start of the intramolecular condensation reaction, and substantial pressures of hydrogen are imposed, the oxide is at least partially reduced during the reaction to the finely divided metallic state in which form it is an active catalyst in the process.

For optimum relationship of yield of piperazine to efficiency, nickel and iron and their oxides should be absent from the copper-containing catalysts. Nickel-containing copper oxide and nickel-containing copper oxide-chromium oxide catalysts are less effective in the condensation at the temperatures recited than are catalysts which contain no nickel. Nickel promotes undesirable deamination side reactions at temperatures around 200° C. and above, and markedly lowers the process efficiency.

The condensation reaction may be conducted in the presence of a volatile solvent for the N-aminoethyl ethanolamine which is inert to the latter and to the reaction products under the conditions of the reaction. Such solvents as dioxane, and the diethyl ethers of ethylene and diethylene glycols, etc. may be use advantageously.

The following examples serve to illustrate the invention. In the examples all parts are given in terms of weight unless otherwise specified.

*Example I*

A mixture of 208 parts of N-aminoethyl ethanolamine and 21 parts of a copper oxide-chromium oxide catalyst was heated at 200° C. for eighteen hours in an autoclave under a total pressure of 1,500 pounds per square inch, imposed by added hydrogen. The reaction mixture was filtered while hot to remove the catalyst, the filtrate was fractionally distilled and the piperazine and unreacted aminoethyl ethanolamine separately recovered, the latter being distilled under reduced pressure. Piperazine was obtained in a yield of 64.2%, with an efficiency of 88.7%.

The catalyst was prepared by the slow addition with agitation of 175 parts of ammonium carbonate $(NH_4)_2CO_3 \cdot H_2O$ dissolved in 1,000 parts of water to a solution of 244 parts of copper nitrate $Cu(NO_3)_2 \cdot 3H_2O$ and 53 parts of chromium nitrate $Cr(NO_3)_3 \cdot 9H_2O$ in 1,000 parts of water, all parts by weight. The precipitated mixed carbonates were filtered off, washed with water, dried at 90° C., and roasted in air at 280° C.–300° C. for 20 minutes. The resultant mixed oxides had a chromium to copper ratio of 13.8 to 100 by weight.

*Example II*

Following the procedures and using the starting materials described in Example I, excepting that the mixture was heated for eighteen hours at 175° C. under a hydrogen pressure of 1,500 pounds per square inch, a piperazine yield of 43.3% was obtained and recovered. The efficiency was 85.3%.

*Example III*

A mixture of 208 parts of N-aminoethyl ethanolamine and 15 parts of a copper-chromium catalyst was heated at 200° C. for ten hours under a hydrogen pressure of 1,500 pounds per square inch, imposed by added hydrogen. The reaction mixture was treated in the manner described in Example I. A 40.6% yield of piperazine was secured, with an efficiency of about 80%.

The catalyst was prepared in the general manner described in Example I excepting that, before use, the finely divided oxides were converted to the metallic state by a preliminary reduction with hydrogen at 350° C.–370° C. for twenty-four hours.

*Example IV*

A slurry of 208 parts of N-aminoethyl ethanolamine, and 20 parts of copper oxide, prepared by the ignition of copper nitrate to constant weight in air, was charged into a stainless steel bomb and reacted for eighteen hours at 200° C., under a total pressure of 1,800 pounds per square inch in an atmosphere of hydrogen. The resultant reaction mixture was filtered while hot, and the filtrate was fractionally distilled, yielding 41.5% of piperazine with a high efficiency of 92%.

*Example V*

Under the conditions recited in Example I, excepting that the run was conducted under a self-induced pressure of about 300 pounds per square inch, in the absence of added hydrogen, a 28.6% yield of piperazine was obtained, and some deamination occurred. The efficiency of the reaction under these conditions was reduced to 50.7%.

*Example VI*

Under reaction conditions similar to those recited in Example I, but wherein 20 parts of a copper oxide-chromium oxide-nickel oxide catalyst were substituted for the copper oxide-chromium oxide catalyst, a yield of about 33% of piperazine was obtained, at an efficiency of about 54.5%. The presence of the nickel caused pronounced deamination during the reaction.

The catalyst was prepared by roasting an intimate mixture of 100 parts of nickel nitrate, 25 parts of cupric nitrate and 3 parts of chromium nitrate in a muffle furnace at 375° C. for three to four hours. These mixed oxides contained nickel, copper and chromium in the ratio of 100:33:1.9.

*Example VII*

A mixture of 1,041 parts of N-aminoethyl ethanolamine and 104 parts of a copper-chromium-iron catalyst was heated in an Adkins rocking bomb autoclave for fifteen hours at 200° C. under a hydrogen pressure ranging between 1,500 and 2,525 pounds per square inch. The reaction mixture was filtered to remove the catalyst, after which the filtrate was fractionally distilled. Piperazine was separately recovered in a yield of 59% with an efficiency of 59%. The piperazine may be recovered, if desired, by dissolving the reaction mixture in water, filtering the aqueous mixture to remove the catalyst, and recrystallizing piperazine hexahydrate from the aqueous filtrate.

The catalyst was prepared by the coprecipitation of the hydroxide and basic carbonates of the metals by the addition of sodium carbonate solution to a solution of the mixed nitrates of the metals. The precipitate was washed with water to remove water-soluble salts, roasted at between 200° C. and 450° C. in air, leached with water, and then reduced in hydrogen. The catalyst contained copper, chromium and iron in the ratio of 46:6:48 by weight.

*Example VIII*

Employing the catalyst recited in Example VII, a mixture of 1,041 parts of N-aminoethyl ethanolamine and 104 parts of the catalyst was heated in a rocking autoclave at 235° C. for nineteen hours under a hydrogen pressure ranging from 1,500 to 2,400 pounds per square inch. Upon fractional distillation of the reaction mixture piperazine was recovered in a yield of 41.3%.

By the practice of the present invention, yields of piperazine of the order of 60% to 65% or more are obtainable, at efficiencies of 85% to 90% or more. This results from limiting losses due to deamination reactions and to such dehydrogenations as produce resinous solids in the reaction mixture. The reducing atmosphere inhibits resinification reactions, which apparently proceed through a dehydrogenation reaction and are independent of any deamination tendency. These advantages are secured without the need for ultra-precise control of the reaction conditions. No by-products are formed which interfere with the ready isolation of quite pure, anhydrous piperazine, and recovery of pure unused aminoethyl ethanolamine by simple fractionation.

The invention is susceptible of modification within the scope of the appended claims.

I claim:

1. Process for producing piperazine, which comprises heating N-aminoethyl ethanolamine at a temperature within the range between about 175° C. and about 220° C., in the presence of added hydrogen and of a copper-containing condensation catalyst, while maintaining the mixture under a pressure of at least 1,000 pounds per square inch by the imposition thereon of hydrogen under pressure, thereby inhibiting deamination reactions and the production of resinous residues, and recovering from the resultant reaction mixture the piperazine thus produced.

2. Process for producing piperazine, which comprises heating N-aminoethyl ethanolamine at a temperature within the range between about 175° C. and about 220° C., in the presence of added hydrogen and of a copper-containing condensation catalyst, while maintaining the mixture under a pressure between about 1,000 and about 2,500 pounds per square inch by the imposition thereon of hydrogen under pressure, thereby inhibiting deamination reactions and the production of resinous residues, and recovering from the resultant reaction mixture the piperazine thus produced.

3. Process for converting N-aminoethyl ethanolamine into piperazine while inhibiting deamination reactions and the production of resinous residues, which comprises heating N-aminoethyl ethanolamine at a temperature within the range between about 175° C. and about 220° C. in the presence of copper oxide, while maintaining the mixture of reactants under a hydrogen pressure of between 1,000 and 2,500 pounds per square inch by the imposition thereon of hydrogen under pressure, thereby inhibiting deamination reactions and the production of resinous residues, and separately recovering from the resultant reaction mixture the piperazine thus produced.

4. Process for converting N-aminoethyl ethanolamine into piperazine while inhibiting deamination reactions and the production of resinous residues, which comprises heating said N-aminoethyl ethanolamine at a temperature within the range between about 175° C. and about 220° C. in the presence of copper chromite, while maintaining the mixture of reactants under a pressure of at least 1,000 pounds per square inch by the imposition thereon of hydrogen under pressure, thereby inhibiting deamination reactions and the production of resinous residues, and separately recovering from the resultant reaction mixture the piperazine thus produced.

BENJAMIN G. WILKES, JR.

REFERENCES CITED

The following references are of record in the file of this patent:

UNITED STATES PATENTS

| Number | Name | Date |
|---|---|---|
| 2,400,022 | Pollard et al. | May 7, 1946 |